Feb. 23, 1971
T. H. PECK
3,565,507
BINOCULAR BODY MICROSCOPE HAVING COMPENSATION FOR OPTICAL
PATH LENGTH CHANGES RESULTING FROM CHANGES
OF INTERPUPILLARY DISTANCE
Filed March 17, 1969
3 Sheets-Sheet 1
FIG. 1
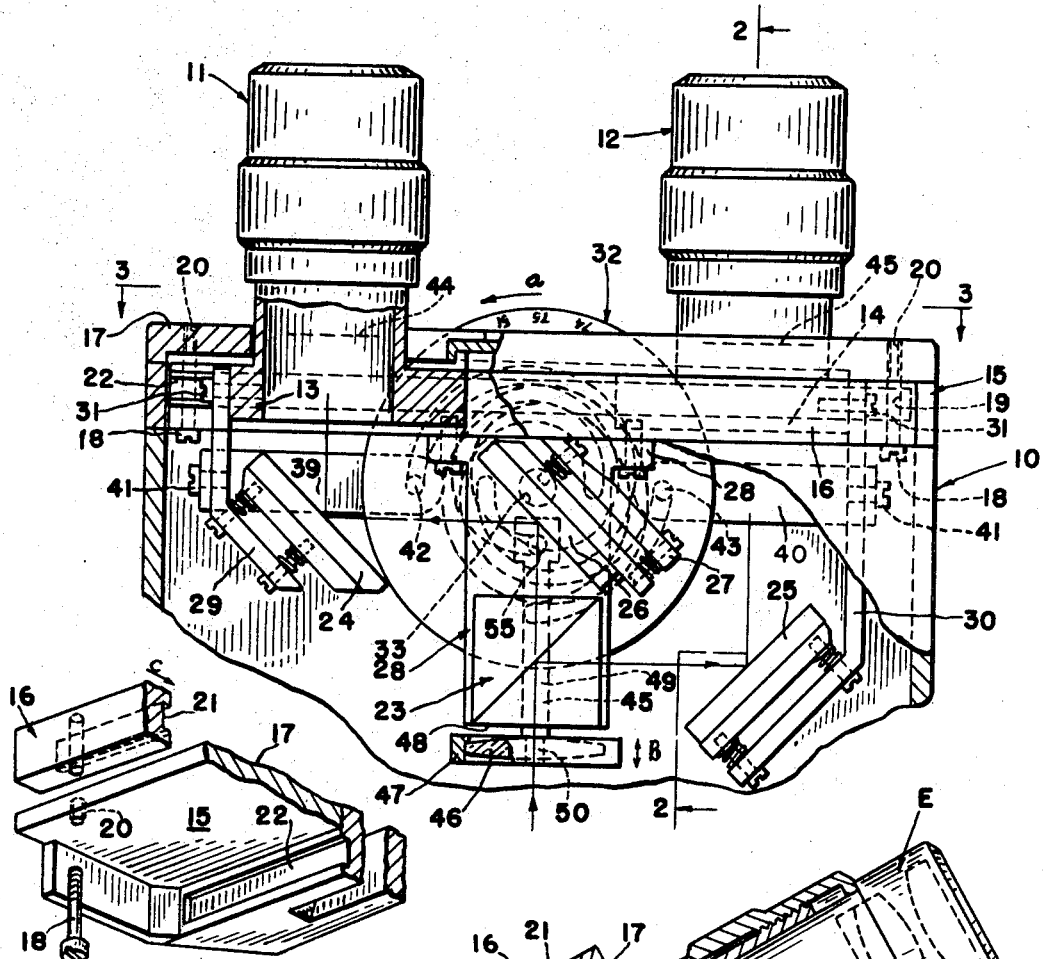
FIG. 9
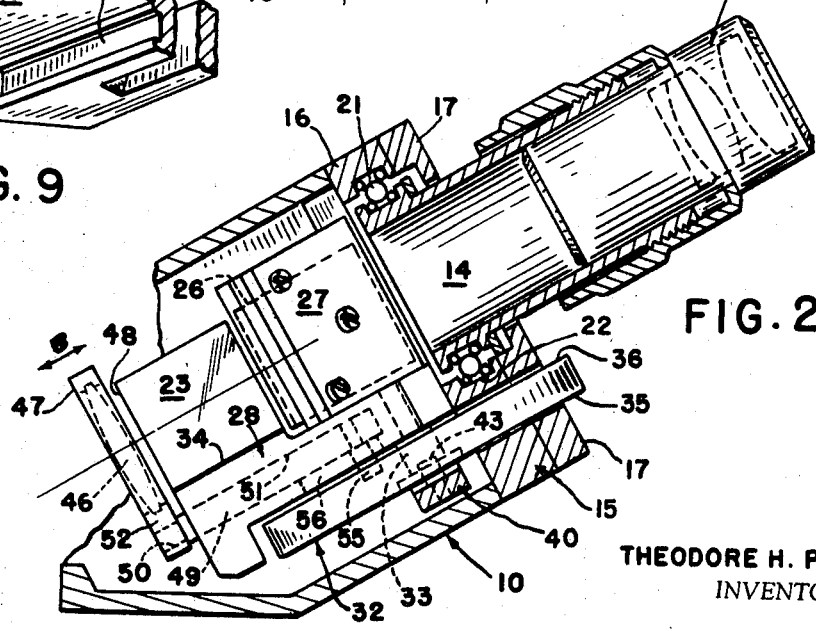
FIG. 2
THEODORE H. PECK
INVENTOR.
BY *Frank C. Parker*
*ATTORNEY*

Feb. 23, 1971  T. H. PECK  3,565,507
BINOCULAR BODY MICROSCOPE HAVING COMPENSATION FOR OPTICAL
PATH LENGTH CHANGES RESULTING FROM CHANGES
OF INTERPUPILLARY DISTANCE
Filed March 17, 1969  3 Sheets-Sheet 2
FIG. 3
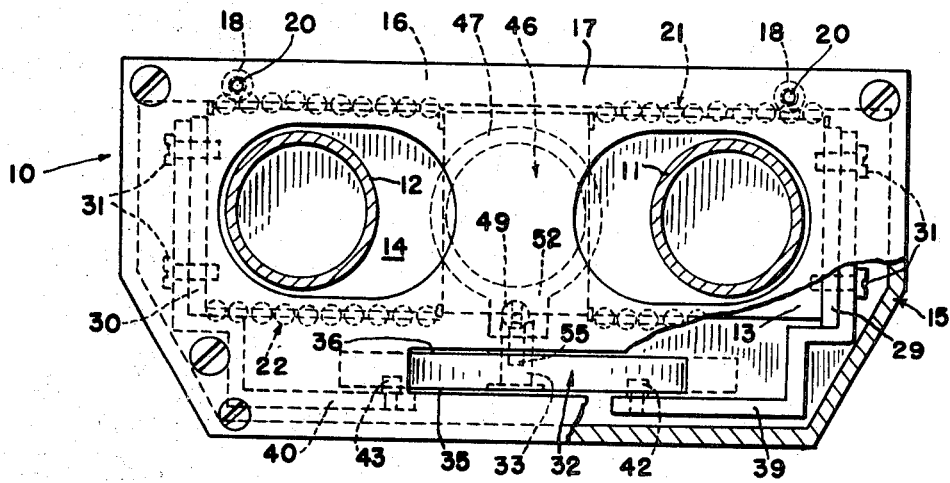
FIG. 4
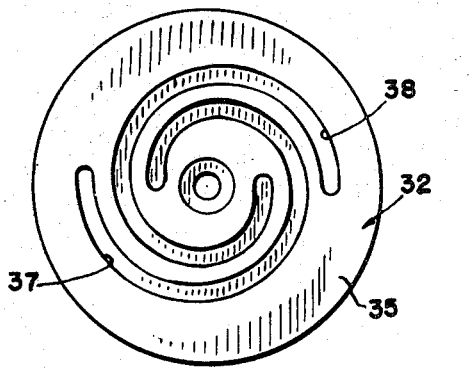
FIG. 5
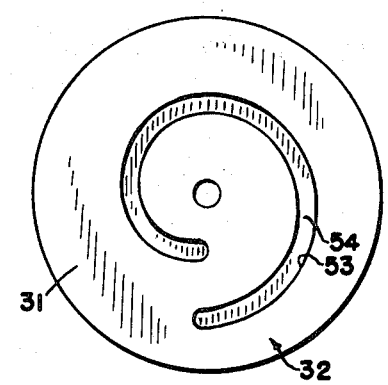
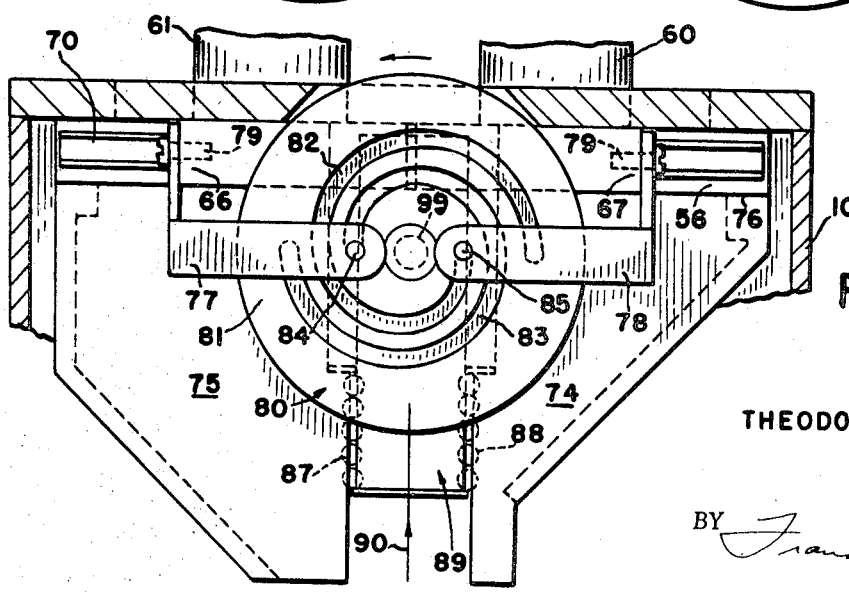
FIG. 8
THEODORE H. PECK
INVENTOR.
BY *Frank C. Parker*
ATTORNEY Feb. 23, 1971 T. H. PECK 3,565,507
BINOCULAR BODY MICROSCOPE HAVING COMPENSATION FOR OPTICAL
PATH LENGTH CHANGES RESULTING FROM CHANGES
OF INTERPUPILLARY DISTANCE
Filed March 17, 1969 3 Sheets-Sheet 3

THEODORE H. PECK
INVENTOR.

BY
ATTORNEY

United States Patent Office 3,565,507
Patented Feb. 23, 1971

3,565,507
BINOCULAR BODY FOR MICROSCOPE HAVING COMPENSATION FOR OPTICAL PATH LENGTH CHANGES RESULTING FROM CHANGES OF INTERPUPILLARY DISTANCE
Theodore H. Peck, Irondequoit, N.Y., assignor to Bausch & Lomb Incorporated, Rochester, N.Y., a corporation of New York
Filed Mar. 17, 1969, Ser. No. 807,493
Int. Cl. G02b 7/06
U.S. Cl. 350—76
6 Claims

ABSTRACT OF THE DISCLOSURE

A binocular eyepiece for a microscope wherein the change in optical path length caused by adjustment of the interpupillary distance is compensated by the movement inter alia of a telescope lens located in the entrance beam of the binocular eyepiece.

SUMMARY OF THE INVENTION

The present invention relates generally to a microscope binocular eyepiece assembly wherein the two eyepieces are movable on slideways to vary the interpupillary distance therebetween.

The problem of correcting for the defocusing of the image planes of the binocular eyepiece whenever the interpupillary distance therebetween is changed has been treated in the prior art. Such correcting practices include either manual or cam operated individual refocusing mechanism for the eyepieces per se, mechanism for adjusting the vertical position of the entire eyepiece housing, and movable lens means or movable prism means for causing coincidence of the microscope image planes formed by the microscope objective and eyepieces respectively.

In microscopes having so-called infinity corrected objectives, the compensation for the change in interpupillary distance may be simply effected by moving a telescope lens located near the entrance side of the binocular body so that the image plane formed by said telescope lens may be moved into coincidence with the image planes which are formed by both eyepieces as shown and described in the present invention.

It is accordingly an object of the present invention to provide a novel binocular eyepiece assembly for a microscope having a compensation for the variation in the length of the optical paths of the image rays which pass therethrough upon change of the interpupillary distance between said eyepieces.

A further object is to provide such a device which is reliable in use and easy to service and wherein repair is facilitated by the simplicity of construction of the operating parts.

Another object of the invention is to provide such a device which is economical and compact in construction, said device including ingenious subassemblies wherein the operating parts are closely coupled to reduce bending stresses and increase accurate operation, and wherein said subassemblies may be separately assembled and tested per se for both optical and mechanical performance.

Further objects and advantages of this invention will be apparent in the form and arrangement of details of construction thereof by referring to the description given hereinbelow taken in connection with the drawings.

DESCRIPTION OF THE DRAWINGS

In the drawings:
FIG. 1 is a plan view of a binocular eyepiece body illustrating the assembled positions of the constituent mechanical details which are shown in one position of use,
FIG. 2 is a side elevational view, partly in section and taken on the line 2—2 of FIG. 1,
FIG. 3 is a vertical view, partly in section taken on the line 3—3 of FIG. 1 showing some of the operational mechanical parts of the binocular assembly,
FIG. 4 is a side elevation showing one of the actuating parts of said assembly,
FIG. 5 is a view similar to FIG. 4 showing the opposite side elevation of said actuating part,
FIG. 8 is a sectional view taken on line 8—8 of FIG. 7,
and
FIG. 9 is an exploded perspective view of certain details of the operating mechanism of the invention.

DESCRIPTION OF PREFERRED FORM OF INVENTION

Figure 6:
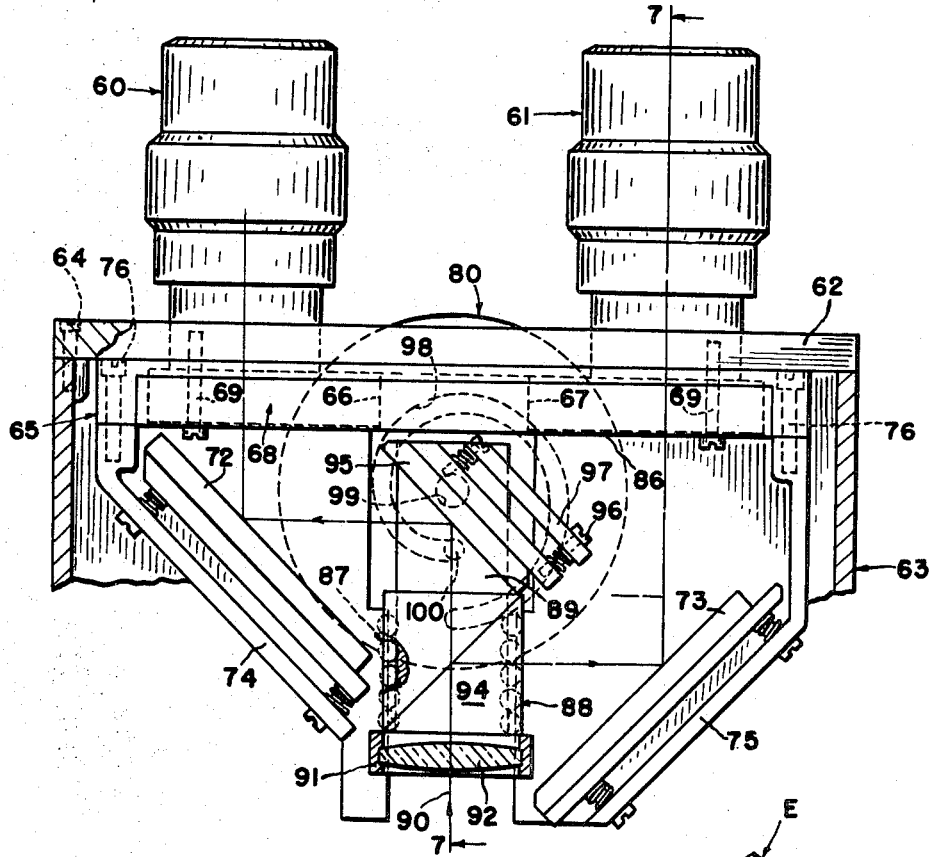
FIG. 6 is a plan view similar to FIG. 1 showing a second form of the present invention.
Figure 7:
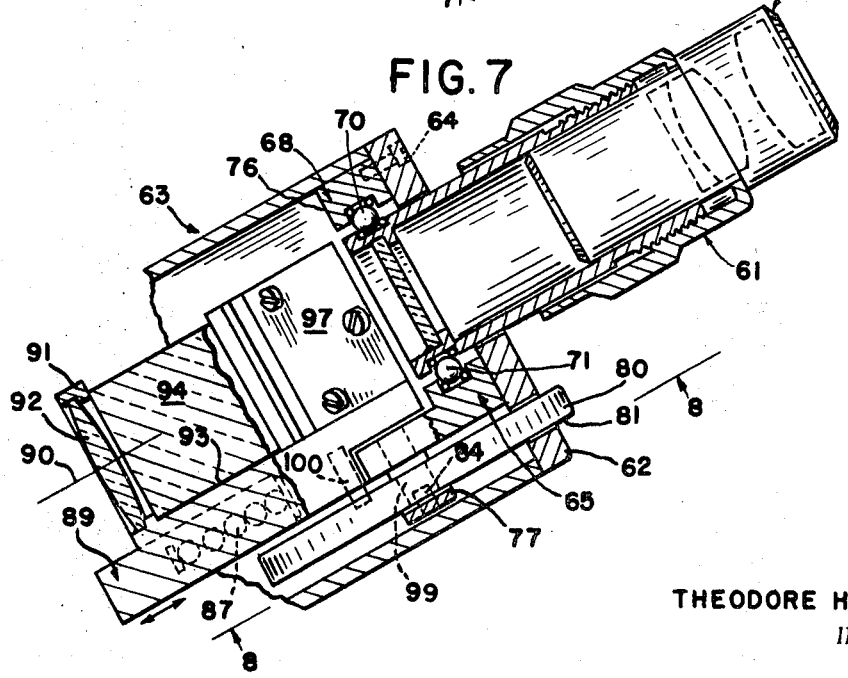
FIG. 7 is a side elevation taken partly sectionally along the line 7—7 of FIG. 6, parts thereof being broken away.

With reference to FIG. 1 of the drawings, there is illustrated a microscope binocular assembly designated generally by numeral 10. Within said binocular assembly 10 is slidably supported a pair of eyepiece focusing tube members 11 and 12 wherein demountable eyepieces E are held which are mounted parallel to each other and are movable toward and away from each other by lateral movements so as to vary the interpupillary distance therebetween.

The eyepiece tube members 11 and 12 preferably are formed as an integral part of a pair of mounting members 13 and 14 respectively which are located substantially coplanar and in tandem to each other. For mounting the mounting members 13 and 14 slidably in the assembly 10, an elongated chassis member 15 is secured on the upper portion of the assembly 10 and along the front side of said chassis member 15 a depending elongated support rail 16 is secured. Said chassis member 15 has a portion 17 serving as a top plate and the rail 16 is held on said top plate portion by a pair of loose fitting screws 18 which fit loosely through corresponding clearance holes 19 in rail 16 and are threaded into tapped holes 20 formed in top plate 17.

On the confronting inner faces of said rail 16 and chassis 15 a pair of elongated bearing recesses 21 and 22 for longitudinal bearings such as the so-called "Franke" bearing is formed extending substantially along a major portion thereof.

Fixed in the lower end of the assembly 10 is a stationary beam divider 23 which is aligned in the optical system of said assembly and is optically aligned respectively with each of said eyepiece focusing tubes 11 and 12 by means of individual inclined side mirrors 24 and 25 via an interposed stationary optically aligned mirror 26. Mirror 26 is attached as shown in FIG. 1 to an upstanding mirror bracket 27 which is formed on a support or mounting block 28. Said mirrors 24 and 25 are individually mounted on rigid angular brackets 29 and 30 attached to the outer surfaces of the sliding eyepiece tube members 11 and 12 such as the screws 31.

According to the present invention an actuating member 32 is located in a compact and efficient manner in the assembly 10, said actuating member being journaled by means of axle pin 33 on mounting block 28. It will be noted that the beam divider 23 is secured by cementing at 34 on the lower end of the mounting block 28. The mechanism above described is remarkably compact and sturdy as stated in the objects of this invention.

The actuating member 32 is preferably circular and is constructed in the form of a disc having two flat and radial sides 35 and 36 and the upper arcuate portion thereof protrudes above the top plate 17 sufficiently to allow a finger to contact thereon whereby the actuating member may be rotated by hand in either direction.

In order to operate the eyepiece carrying tube members 11 and 12 to change the interpupillary distance, a pair of similar spiral cams 37 and 38 are formed on the sides of a pair of indented spiral slots at an angular separation of substantially 180° to each other along the face 35 for a purpose which will appear hereinafter. A pair of connecting arms 39 and 40 are fixed respectively to the rigid arms 29 and 30 by means such as the screws 41 so that the arms extend toward each other across the rear face 35 of the actuating member closely adjacent thereto and terminating in the vicinity of the spiral surfaces 37 and 38.

It will be observed that cam follower elements 42 and 43 are fixed in the inner ends of the arms 39 and 40 so that these cam followers project into said slots and engage respectively cam surfaces 37 and 38. Upon rotation of the actuating member 32 in the direction of the arrow $a$ it will be seen that the eyepiece tube members 11 and 12 will be moved from the position of greatest separation to form shorter interpupillary distances.

In order to compensate for the change in the optical path length of the optical system between the beam divider 23 and the individual image planes 44 and 45 for the eyepiece tubes 11 and 12 when the interpupillary distances thereof is varied, a compensating lens 46 is provided. Said lens 46 is mounted in a lens cell 47 which is held closely adjacent to the underside 48 of the beam splitter 23 whereby an effective arrangement in compactness and rigidity is achieved.

In order to mount said lens cell 47 for axial motion in the direction of the double-ended arrow B, a preferably cylindrical stem 49 is provided which is securely anchored at 50 in the lens cell 47. The stem 49 is slidably journaled in a smooth bore 51 which is formed in line with the rim portion 52 of the lens cell 47 and extends substantially parallel to the axis of the eyepiece tubes 11 and 12 about midway therebetween.

For securing vertical or axial movement of the lens cell 47, a compensating cam surface 53 is provided, said surface being formed on a boundary side of a spiral cam slot 54 in a rotational direction in agreement with the direction of the similar cam surfaces 37 and 38 when the cam surfaces are viewed from their respective sides of the actuating member 32. The cam surface 53 is formed at substantially 90° angularly from either of the spiral cam surfaces 37 and 38 as shown in FIGS. 4 and 5 of the drawings although different arrangements of cams and cam followers may be provided so that other rotational orientations between said cam surfaces are possible.

In the upper end of the cylindrical stem 49 is fixed a protruding cam follower pin 55 which protrudes through an open slot 56 formed longitudinally in the block 28 so as to prevent relative rotation, said pin engaging with cam surface 53 to form an operative connection therewith.

Rotation of actuating member 32 results in longitudinal movement of the lens cell 47 by a sufficient amount to exactly compensate for the aforesaid change in optical path length when the accompanying movement of the binocular eyepiece 11 and 12 occurs.

DESCRIPTION OF SECOND FORM OF INVENTION

A general comparison of the essential characteristics of the first and second forms of the present invention is believed to be beneficial at this point in the description. The summary of the essential characteristics is as follows:

COMMON TO FORM I AND FORM II (1) The binocular eyepiece tube members are *moved* laterally to vary the interpupillary distance therebetween.
(2) A compensating lens is *moved* axially in the optical system to compensate for the change in optical path length when the interpupillary distance is changed.

PECULIAR TO FORM I (FIG. 1)

(1) Side mirrors 24 and 25 are attached to the eyepiece tube mounting members 11 and 12 so that these mirrors are *movable* with said members.
(2) Beam divider 23 is *stationary*.

PECULIAR TO FORM II (FIG. 6)

(1) Side mirrors 72 and 73 are secured to a chassis member 65 and consequently are *stationary*.
(2) Beam divider 94 is *movable* together with the compensating lens 92 and the central mirror 95.

In the second form of the present invention as shown in FIG. 6, the binocular eyepieces are supported in tubular members numbered 60 and 61 similar to FIG. 1 and the top plate portion of the chassis member is numbered 62. These parts also are similar to the corresponding parts of Form I. Top plate portion 62 is removably secured onto an assembly generally indicated by numeral 63 by an suitable means such as screws, one of which is shown at 64.

As best shown in FIG. 6, an elongated chassis or support member 65 is provided wherein a pair of eyepiece focusing tubular members 66 and 67 are slidably held in tandem to each other similar to FIG. 1. In the chassis member 65 is formed an elongated interior recess similar to that shown in FIG. 9 wherein the slide elements 66 and 67 of the eyepiece focusing members 60 and 61 are housed. On the front side of chassis member 65 is secured a support rail 68 similar to rail 16 of FIG. 9, said rail being secured by screws 69 which are threaded in the top plate portion of said chassis member.

Similarly to FIGS. 1, 2 and 9, elongated bearing means, such as so-called "Franke" bearings 70 and 71 are formed along the inner confronting surfaces of the rail 68 and chassis member 65 respectively whereon said slide elements 66 and 67 are carried.

As shown in FIG. 6 a pair of inclined side mirrors 72 and 73 are mounted in optical alignment with the eyepiece focusing members 60 and 61 in a stationary position by means of two rigid brackets 74 and 75 as best shown in FIG. 8 which are anchored to the outer ends of the chassis member 65 by means of capscrews 76. The brackets 74 and 75 not only support the mirrors 72 and 73 but serve as a guide and support for a movable telescope lens to be described hereinafter.

On the outer end face of the slide portions 66 and 67 as best shown in FIG. 8 are individually secured a pair of rigid pusher fingers 77 and 78 by any preferred means such as the screws 79. Fingers 77 and 78 as well as the slide portions 66 and 67 are shown in their inward positions in FIG. 8.

An actuating wheel or disc 80 is provided for moving said fingers 77 and 78 and for this purpose the outer face 81 of the disc has formed therein a pair of similar spiral cam slots 82 and 83 which are angularly separated at their corresponding ends by 180° from each other as shown in FIG. 8 and more in detail in FIG. 4. On the inner ends of said pusher fingers 77 and 78 are formed cam follower elements in the shape of pins 84 and 85 which are suitably fixed in said inner ends and engage operatively with the cam slots 82 and 83.

It will be noted that the aformentioned brackets 74 and 75 are fixed to the lower surface 86 of the chassis member 65 so that along the lower part of the inner confronting edges of said brackets may be formed a pair of extended bearing members 87 and 88 wherein a carrier block 89 is slidably retained for motion parallel to the optical axis 90 of the optical system.

On the lower end of the slidable carrier block 89 is fixedly formed an upstanding lens cell 91 wherein is secured a compensating lens 92 which is moved along axis 90 so as to compensate for the change in the optical path length during change of interpupillary distance, the same as lens 46 in FIG. 1. Adjacent to said lens 92 is fixedly mounted on the carrier block 89 by any preferred means such as cementing at 93, a beam divider 94 in alignment with axis 90 whereby two beams of image rays are produced in the usual manner as indicated in FIG. 6.

Spaced above said beam divider 94 in optical alignment therewith is a movable inclined mirror 95 which is held as indicated by the screws 96 onto an upstanding flange 97 formed preferably integrally on the upper end of the carrier block 89.

By the above described arrangement of mechanism, the inclined mirror 95, the beam divider 94 and the compensating lens 92 all are carried by the block 89 and move simultaneously in the same direction along the optical axis 90 of the instrument and this feature is one of the distinctive characteristics of the second form of the invention. The carrier block 89 as mentioned heretofore serves to carry three of the essential movable elements.

In order to provide the linear motion for the carrier block 89 a spiral cam surface 98 is formed in a spiral cam slot in the actuating member 80 as mentioned heretofore and the latter member is rotatably mounted on an axle pin 99 which is fixed in the chassis member 65. Protruding from the rear face of the sliding block 89 is a cam follower pin 100 which is anchored in said block and operatively engages the surface 98 in said cam slot. The terminal end of cam slots 82 and 83 are angularly related to the terminal ends of the other cam slot 98 (FIG. 6) on the opposite side of the actuating member 80 at 90° for the same reasons given in regard to the first form of the invention.

With regard to the operation of the first form of the invention as shown in FIG. 1, rotation of the actuating member 32 results in:

(1) A change in the interpupillary distance between the eyepiece focusing tubes 11 and 12 and since the mirrors 24 and 25 are carried with said tubes, a change in the optical path length results. By this action the image formed by the lens 46 is caused to move away from the focal planes 44 and 45 belonging to said eyepieces.

(2) The mirror 26 remains stationary as well as the beam divider 23.

(3) The compensating lens 46 is moved to bring the image formed thereby into coincidence with the image planes 44 and 45.

With regard to the operation of the second form of the invention as shown in FIG. 6, rotation of the actuating member 80 results in:

(1) A change in the interpupillary distance between the eyepieces 60 and 61 but the mirrors 72 and 73 remain stationary.

(2) The compensating lens 92 is moved or refocused automatically and the adjacent beam divider 94 and the inclined mirror 95 are moved to maintain optical alignment of the entire optical system of the instrument.

It will be seen in the foregoing description that there is here provided a binocular eyepiece body for a microscope having optical compensation for the change in the length of the optical path when the interpupillary or interocular distance is changed, said body incorporating compact and efficient structure which is sturdy and dependable in optical alignment in fulfillment of the stated objects of the present invention, the scope of the invention being defined by the claims appended herebelow wherein,

I claim:

1. In a binocular eyepiece assembly having a chassis member,
a pair of parallel spaced eyepiece tube members wherein eyepiece lenses are individually mounted, the optical axes of said lenses forming the upper part of the optical axis of said binocular eyepiece assembly, said tubes being slidably mounted on said member for lateral motion to vary the interpupillary distance therebetween,
a lens holder and a compensating lens secured therein and having an axis which forms the lower part of said optical axis, said holder being mounted to carry said lens along said optical axis, the axial motion of the lens being such as to compensate the change in the length of the optical path when the interpupillary distance is changed,
a beam divider and means for mounting said divider on said chassis member in alignment with said optical axis between said compensating lens and said lenses,
a pair of inclined side mirrors facing inwardly and aligned on said optical axis to deflect the individual paths of image rays coming from the beam divider along the axes of said lenses,
means for holding said side mirrors individually in alignment with the axes of said lenses,
a third inclined mirror located at a fixed distance from said beam divider in optical alignment therewith between said divider and one of said side mirrors,
an actuating disc rotatably mounted on said chassis member centrally of said tubes and having two opposite faces,
a pair of duplicate spiral cam surfaces and a spiral compensating cam surface formed in predetermined rotational orientation to each other on said faces, and
connecting mechanism movably constructed to engage each of said similar spiral cam surfaces and said compensating cam surface so as to move one of said means along with said tubes and lens holder when the other of said means are stationary.

2. A binocular eyepiece assembly as set forth in claim 1 further characterized by said side mirrors being carried for lateral motion individually by the respective tube members.

3. A binocular eyepiece assembly constructed according to claim 1 further characterized by said duplicate spiral cam surfaces are formed on one of said radial faces and said spiral compensating cam surface is formed on an opposite one of said faces.

4. In a binocular eyepiece assembly having a chassis member,
a pair of parallel spaced eyepiece tube members wherein eyepiece lenses are individually mounted, the optical axes of said lenses forming the upper part of the optical axis of said assembly, and means for mounting said tube members slidably on said chassis member for lateral motion to vary the interpupillary distance therebetween,
a lens holder and a compensating lens secured therein and having an axis which forms the lower part of said optical axis, the axial motion of the lens being such as to compensate the change in the length of the optical path when the interpupillary distance is changed,
a beam divider and means for mounting said divider in a fixed position on said chassis in alignment with said optical axis between the compensating lens and said lenses,
a pair of inclined side mirrors facing inwardly and aligned on said optical axis to deflect the individual paths of the image rays coming from the beam divider along the axes of said lenses,
means carried by said eyepiece tube members for individually mounting said side mirrors thereon,
a third inclined mirror located at a fixed distance from said beam divider in optical alignment therewith between said divider and one of said side mirrors,
an actuating disc rotatably mounted on said chassis centrally of said tubes and having opposed flat faces lying parallel to the plane of the eyepiece axes,
a pair of duplicate cam surfaces formed on one of said flat faces, the corresponding ends of said surfaces being located at 180° to each other,
a pair of rigid substantially coplanar connecting arms which are fixed on said eyepiece tube members and project toward each other, cam follower elements formed on the proximate ends of said arms and engaging said cam surfaces to move said tube members simultaneously upon rotation of said actuating member, an elongated stem anchored at one end in said lens holder and slidably mounted in said chassis for movement parallel to the axis of said compensating lens, a compensating spiral cam surface having an end formed in predetermined angular orientation to the ends of first said cam surfaces on the other of said faces of the actuation member, and means operably connecting the compensating cam surface with said stem so that the beam divider moves simultaneously with said side mirrors.

5. A binocular eyepiece assembly comprising:

a chassis member wherein a pair of eyepiece tube members are held, said members having parallel tubes formed thereon in which a pair of eyepieces are mounted, elongated bearing means formed from side to side in said chassis member whereon said members are fitted to slide to and from each other to vary the interpupillary distance between said eyepieces which form the upper part of the optical system of said assembly, a pair of coextensive parallel opposed walls forming part of a recess from side to side in said chassis member, a pair of recessed coextensive walls formed in the first said walls, said elongated bearing means being formed on each recessed wall and a transversely adjustable separate rail extending parallel to said pair of walls wherein one of said recessed walls is formed, said bearing means being cooperatively formed on opposite sides of said eyepiece tube members so that said members are slidably supported for travel along said bearing means, a lens holder and a compensating lens secured therein and having an axis which forms the lower part of said optical axis, the axial motion of the lens being such as to compensate the change in the length of the optical path when the interpupillary distance is changed, a beam divider and means for mounting said divider in a fixed position on said chassis in alignment with said optical axis between the compensating lens and said lenses, a pair of inclined side mirrors facing inwardly and aligned on said optical axis to deflect the individual paths of the image rays coming from the beam divider along the axes of said lenses, means carried by said eyepiece tube members for individually carrying said side mirrors thereon, a third inclined mirror located at a fixed distance from said beam divider in optical alignment therewith between said divider and one of said side mirrors, an actuating disc rotatably mounted on said chassis centrally of said tubes and having opposed flat faces lying parallel to the plane of the eyepiece axes, a pair of duplicate cam surfaces formed on one of said flat faces, the corresponding ends of said surfaces being located at 180° to each other, a pair of rigid substantially coplanar connecting means which are fixed on said eyepiece tube members and project toward each other, cam follower elements formed on the proximate ends of said connecting means and engaging said cam surfaces to move said tube members simultaneously upon rotation of said actuating member, an elongated stem anchored at one end in said lens holder and slidably mounted in said chassis for movement parallel to the axis of said compensating lens, a compensating spiral cam surface formed in predetermined angular orientation to the ends of said first cam surfaces on the other of said faces of the actuation member, and means operably connecting the compensating cam surface with said stem so that the beam divider and said side mirrors move simultaneously.

6. In a binocular eyepiece assembly a chassis member fixed in the upper part of said assembly, a pair of spaced eyepiece tube members which are slidably mounted for lateral motion in said chassis member for changing the interpupillary distance of the members, said members having tubes formed thereon parallel to each wherein eyepiece lenses forming the upper part of the optical system of the assembly are carried, a lens holder and a compensating lens secured therein forming the lower part of said optical system, first means for mounting said holder for carrying said lens along its optical axis, a beam divider and means including said first means for mounting said divider on said chassis member in alignment with said optical system between said compensating lens and said eyepiece lenses, a pair of inclined side mirrors forming part of said optical system between the beam divider and eyepiece lenses in opposite branches of said system, third mounting means which fix said side mirrors on opposite ends of said chassis member in dependent position aligned in said optical system, a third inclined mirror which forms part of the optical system and is aligned between said beam divider and one of said side mirrors, means including said first means for mounting the third mirror for movement with said compensating lens and beam divider, an actuating disc rotatably mounted on said chassis member centrally of said eyepiece tube members, a pair of duplicate spiral cam surfaces formed on one face of said disc and a spiral compensating cam formed on the other face of said disc, the ends of all of such surfaces being arranged in predetermined angular relation to each other, and connecting mechanism movably constructed to engage each of said cam surfaces and said first mounting means whereby the compensating lens, beam divider and third mirror are all moved together a commensurate amount upon varying said interpupillary distance while holding said side mirrors stationary.

References Cited

UNITED STATES PATENTS 3,309,161   3/1967   Boughton _____ 350—76X

DAVID SCHONBERG, Primary Examiner

T. H. KUSMER, Assistant Examiner

U.S. Cl. X.R.

350—35, 46